US008602306B2

(12) United States Patent
Deborgies

(10) Patent No.: US 8,602,306 B2
(45) Date of Patent: Dec. 10, 2013

(54) DEVICE FOR PROTECTING CONTACTLESS COMMUNICATION OBJECTS AGAINST FRAUD

(75) Inventor: Luc Deborgies, Chatillon (FR)

(73) Assignee: Xiring SA, Suresnes Cedex (FR)

(*) Notice: Subject to any disclaimer, the term of this patent is extended or adjusted under 35 U.S.C. 154(b) by 443 days.

(21) Appl. No.: 12/434,013

(22) Filed: May 1, 2009

(65) Prior Publication Data
US 2009/0224035 A1    Sep. 10, 2009

Related U.S. Application Data

(63) Continuation of application No. PCT/FR2007/001809, filed on Oct. 31, 2007.

(30) Foreign Application Priority Data

Nov. 3, 2006    (FR) ...................................... 06 09610

(51) Int. Cl.
G06K 7/08    (2006.01)
G06K 19/06    (2006.01)
H04K 3/00    (2006.01)
H04B 7/00    (2006.01)
H04Q 5/22    (2006.01)

(52) U.S. Cl.
USPC .............. 235/451; 235/492; 455/1; 455/41.2; 340/10.1; 340/10.3; 340/10.4

(58) Field of Classification Search
USPC ................. 235/492, 451, 379, 380; 340/10.1, 340/572.1, 870.07, 870.3, 870.32; 455/1, 455/26.1, 41.1–41.3, 410, 411; 380/252
See application file for complete search history.

(56) References Cited

U.S. PATENT DOCUMENTS

| | | | |
|---|---|---|---|
| 5,165,098 A * | 11/1992 | Hoivik | 380/254 |
| 6,429,768 B1 * | 8/2002 | Flick | 340/5.2 |
| 6,636,146 B1 * | 10/2003 | Wehoski | 340/10.4 |

(Continued)

FOREIGN PATENT DOCUMENTS

| | | |
|---|---|---|
| EP | 0472472 B1 | 11/1995 |
| WO | WO 98/26370 | 6/1998 |
| WO | WO2005/031663 A2 | 4/2005 |
| WO | WO2005/052846 A2 | 6/2005 |

OTHER PUBLICATIONS

English Translation of Written Opinion of the ISR from PCT/FR2007/001809 mailed Jul. 4, 2008.

(Continued)

*Primary Examiner* — Michael G Lee
*Assistant Examiner* — Suezu Ellis
(74) *Attorney, Agent, or Firm* — Additon, Higgins, Pendleton & Ashe, P.A.

(57) ABSTRACT

The protection device (1) avoids accidental or fraudulent intrusion of at least one contactless communication object (3) with a smart circuit (31, 32) storing sensitive information or information giving access to services, the electronic circuit of the protected object remaining unchanged, notably by means (13) for receiving radio signals (S22) in a range of frequencies of the order of one megahertz to a few tens of megahertz, the received radio signals generating the operating power for enabling a circuit (11) generating a scrambling signal to be emitted by emission means (14) of the protection device as scrambling radio waves (S21) and switching means (12) validating or invalidating the operation of the generator of the scrambling signal of the protection device.

33 Claims, 4 Drawing Sheets

(56) References Cited

U.S. PATENT DOCUMENTS

| | | | |
|---|---|---|---|
| 7,185,806 B2* | 3/2007 | Sines | 235/380 |
| 7,221,900 B2* | 5/2007 | Reade et al. | 455/1 |
| 7,522,905 B2* | 4/2009 | Hammad et al. | 455/410 |
| 7,578,431 B2* | 8/2009 | Tanner et al. | 235/375 |
| 7,889,056 B2* | 2/2011 | Horne | 340/10.1 |
| 8,035,521 B2* | 10/2011 | Lees | 340/572.4 |
| 2006/0000898 A1* | 1/2006 | Bonalle et al. | 235/380 |
| 2006/0244630 A1* | 11/2006 | Finkenzeller | 340/870.07 |
| 2006/0273176 A1* | 12/2006 | Audebert et al. | 235/451 |
| 2008/0237346 A1* | 10/2008 | Savry et al. | 235/449 |
| 2008/0297321 A1* | 12/2008 | Chiu | 340/10.2 |
| 2009/0041241 A1* | 2/2009 | Dobyns et al. | 380/252 |
| 2009/0053996 A1* | 2/2009 | Enguent et al. | 455/26.1 |
| 2009/0081943 A1* | 3/2009 | Dobyns et al. | 455/1 |
| 2009/0258592 A1* | 10/2009 | Huang | 455/1 |
| 2013/0178156 A1* | 7/2013 | Kim et al. | 455/41.1 |

OTHER PUBLICATIONS

International Search Report from PCT/FR2007/001809 mailed Jul. 4, 2008.

Juels A et al. Association for Computing Machinery: "The Blocker Tag: Selective Blocking of RFID Tags for Consumer Privacy"; CCS'03 Oct. 27-30, 2003, Wash.DC, Copyright 2003 ACM 1-58113-738-9; 9 pages.

\* cited by examiner

DEVICE FOR PROTECTING CONTACTLESS COMMUNICATION OBJECTS AGAINST FRAUD

CROSS-REFERENCE TO PRIORITY APPLICATIONS

This application is a continuation of, and claims the benefit of, the commonly assigned French Patent Application Serial No. 0609610 (filed Nov. 3, 2006, in the French Patent Office), and the commonly assigned International Patent Application No. PCT/FR2007/001809 (filed Oct. 31, 2007, in the European Patent Office), both of which are hereby incorporated by reference in their entirety.

FIELD OF THE INVENTION

The invention relates to the field of contactless communications between a terminal or a contactless reader on the one hand, and contactless communication objects on the other hand. The invention notably relates to a device for protecting contactless communication objects

BACKGROUND

Contactless communication objects, such as, for example, contactless communicating integrated circuit cards are used in a very diverse way, for example for making a payment, achieving an identification of the bearer of the contactless communication object or storing information. Cards of this type are, for example, used for controlling access or for automatic payment in the subway. The user simply passes his/her card in proximity to a terminal, for example controlling access to the subway, in order to activate the card which communicates to the terminal the required information for certifying the validity of a season ticket. By using an integrated circuit card which communicates without any contact with a terminal or a port or a contactless reader, the user may, for example, save a lot of time.

In this type of communication system between a terminal or a contactless reader and a contactless communication object, the communication is achieved by emission of radiofrequency waves. The ISO/IEC 14443 standard, established by the International Standardization Organization and the International Electrotechnical Commission, for example defines a set of rules relating to identification cards, contactless integrated circuit cards and proximity cards. According to this standard, the terminal or contactless reader emits radiofrequency signals in a determined spectrum of frequencies around 13.56 MHz, in order to transmit information to the contactless card and energy for powering it. Other features of this standard, for example, relate to anti-collision rules when a terminal or contactless reader communicates with several cards simultaneously.

However, applications achieved by contactless communication objects are not generally secured. Indeed, contactless communication objects, such as for example cards, are generally enabled automatically upon their passing in an area within range of a terminal or contactless reader, the range area corresponding to a region of space around the terminal or reader, in which the radiofrequency signal emitted by the terminal or reader has sufficient power for enabling the contactless communication payment card. Thus, the bearer of a contactless communication payment card may be taxed, without any valid reason, accidentally or by a hacker terminal or reader. A technical problem of the cards or contactless communication objects is therefore to protect these cards or these objects against possible intrusions or against involuntary use.

Further, a contactless communication object such as for example a card, may generally be used by any user. With a stolen subway access card, it is for example possible to open paying access gates. Another technical problem of the cards or contactless communication objects is therefore to allow their use by a user or a determined group of users, in order to, for example, protect these cards or these objects against theft.

Patent application WO 2005/031663 teaches about a payment device relating to contactless payment cards, secured by measuring a biometric parameter of the user. A reader of the biometric parameter thus communicates with the payment card in order to authorize enabling of the card and to make a payment, the card by default being, for example, in a disabled state. However, the making of such a secured payment device requires modification of the layout of the electronic circuit of the contactless payment card in order to have a secured communications link between the biometric reader and the payment card on the one hand, and a communications link with a controlled payment terminal in an enabled or disabled state on the other hand. These complex changes brought into a payment card, the volume of which is very limited, are therefore very costly. Moreover, such a security device requires having a biometric reader associated with each payment card.

A scrambler is also known from document WO 2005/052846, for scrambling the contactless reading of data media by a reader emitting electromagnetic sweep signals, having a radio interface for receiving electromagnetic signals, having analysis means for analyzing the electromagnetic signals received by the radio interface, and having scrambling signal generator means for generating a scrambling signal, the analysis means for analyzing the received electromagnetic signals being provided in order to identify the sweep signals of the reader from the received electromagnetic signals, and when the sweep signals are detected, in order to transmit a control signal to the scrambling signal generator means, the scrambling signal generator means being arranged in order to generate the scrambling signal and to transmit it via the radio interface upon receiving a control signal. But this type of device does not allow validation or invalidation of the scrambling by the scrambler via controlled switching means, according to the result of a comparison performed by comparison means between a piece of information stemming from interactive authentication means on the one hand and a piece of information stored in the memory storage means on the other hand.

SUMMARY OF THE INVENTION

The objective of the present invention is to find a remedy to one or more drawbacks of the prior art by proposing a protection device for a contactless communication object, the contactless communication object communicating with a contactless reader or terminal, being simply protected against accidental or fraudulent intrusion, without requiring a change in the layout of the electronic circuit of this object.

This objective is achieved by means of a protection device for a contactless communication object with a smart circuit storing sensitive information or information giving access to services, characterized in that the protection device comprises at least radio receiving means for first radio signals emitted by a contactless reader or terminal, in a range of frequencies of the order of one megahertz to a few tens of megahertz, the first received signals generating the energy for operating the protection device in order to enable a circuit of the protection device generating a scrambling signal to be emitted by emission means of the protection device as scrambling radio waves intended for the terminal or reader, the scrambling radio waves being produced upon receiving the first signals with sufficient power in order to be received by the radio receiving means of the terminal or reader and to deteriorate the reception by the radio receiving means of the terminal or of the reader, of second radio signals emitted by the contactless communication object, in response to enabling by the terminal or reader, and switching means for validating or invalidating the scrambling by the protection device, the switching means of the protection device being controlled, according to the result of a comparison performed, by comparison means between a piece of information stemming from interactive authentication means on the one hand and a piece of information stored in memory storage means of the protection device on the other hand.

According to another particularity, the contactless communication object protected by the protection device is enabled in an area within the range of the terminal or reader, the terminal or reader emitting the first radio signals by radio emission means, in order to communicate with the contactless communication object and to provide energy to the contactless communication object by the radio receiving means of the contactless communication object.

The contactless communication object emitting the second radio signals by radio emission means of the contactless communication object, in order to communicate with the terminal or the reader, via the radio receiving means of the terminal or reader.

According to another particularity, the radio receiving means of the contactless communication object and the radio receiving means of the protection device each comprise a coil belonging to or forming a part of a determined tuned resonant circuit.

According to another particularity, the radio emission means of the contactless communication object and the radio emission means of the protection device each comprise the coil in the tuned resonant circuit used for radio reception.

According to another particularity, as the communication between the terminal or the reader on the one hand, and the contactless communication object on the other hand, is performed according to a determined anti-collision protocol, the contactless communication object emitting the second radio signals in response to the first radio signals at least after emission of a request by the first signals, the circuit of the protection device controls emission of scrambling radio waves in response to the first radio signals, the emission of the scrambling radio waves being maintained during the reception of the first signals.

According to another particularity, the scrambling signal received by the terminal or reader, is representative of determined data processed by processing means of the terminal or of the reader, in order to cause a reinitialization in the execution of the anti-collision protocol.

According to another particularity, the scrambling signal received by the terminal or reader, is representative of determined data processed by processing means of the terminal or reader in order to cause a saturation of the processing means.

According to another particularity, the scrambling signal generated upon receiving the first signals emitted by the terminal or reader, by the circuit of the protection device, is a predetermined signal for saving the energy expended by the circuit in favor of the energy used by the radio emission means of the protection device.

According to another particularity, the circuit of the protection device comprises a counter for dividing the modulation frequency of the first signals emitted by the terminal or reader.

Another objective of the present invention is to propose a protection device against theft, by protecting the use of a contactless communication object by identification means.

According to this objective, the interactive means of the protection device comprise a biometric sensor transmitting to an authentication circuit of the protection device, a piece of information representative of a measured biometric parameter to be compared with at least one piece of information representative of a biometric parameter of a user authorized to use the contactless communication object, making up the information stored in the memory storage means of the protection device.

According to one alternative, the interactive means of the protection device comprise an alphanumerical keyboard transmitting to an authentication circuit of the protection device, a piece of information representative of a code entered by a user to be compared with at least one authorization code for using the contactless communication object, making up the information stored in the memory storage means of the protection device.

According to another particularity, the switching means comprise a switch or push-button positioned at the surface of the protection device or in a recessed housing made in the thickness of the protection device.

According to another particularity, the switching means comprise an electronic switch positioned at the end of a line of communication connected to the protection device.

Another objective of the present invention is to find a remedy to one or several drawbacks of the prior art by proposing a portable contactless communications system, in which a contactless communication object is simply protected against accidental or fraudulent intrusion, without requiring a change in the layout of the electronic circuit of the object.

This objective is achieved by means of a secured portable contactless communication system comprising at least one contactless communication object with a smart circuit storing sensitive information or information giving access to services, the contactless communication object comprising radio receiving means for communication and power supply signals and radio emission means for communication signals, a first determined coil in a first tuned resonant circuit belonging to or forming a part of the radio emission and reception means of the contactless communication object, the system being characterized in that it includes at least:

one protection device comprising radio receiving means for communication and power supply signals, in a range of frequencies of the order of one megahertz to few tens of megahertz, in order to enable a circuit of the protection device generating a scrambling signal to be emitted by the emission means of the protection device as scrambling radio waves, a second determined coil in a second tuned resonant circuit belonging to or forming a part of the radio emission and reception means of the protection device, the protection device comprising switching means allowing operation of the generator of the scrambling signal of the protection device to be validated or invalidated.

As the means for switching the scrambling circuit are controlled, according to the result of a comparison performed, by comparison means between one piece of information stemming from interactive authentication means on the one hand and one piece of information stored in the memory storage means of the protection device on the other hand.

According to another particularity, the protection device and the contactless communication object are firmly attached to each other in a casing with a secured closure member, the closing of which validates operation of the protection device. Stated differently, the casing may house the protection device and the contactless communication object.

According to another particularity, the secured casing is molded in a single block around the protection device and the contactless communication object.

According to another particularity, the secured casing is closed around the protection device and the contactless communication object, the opening of the casing being controlled by a secured key.

Another objective of the present invention is to allow the protection of a plurality of contactless communication objects by a same protection device.

According to this objective, the secured casing includes a housing for receiving at least one additional contactless communication object storing sensitive information or information giving access to services.

Another objective of the present invention is to propose a contactless communication system protected against theft, by protecting its use by identification means.

According to this objective, the interactive authentication means comprise an alphanumerical keyboard transmitting to the comparison means, a piece of information representative of a code entered by a user, compared with at least one code for authorizing the use of the contactless communication object.

According to another particularity, the interactive authentication means comprise a biometric sensor transmitting to the comparison means, a piece of information representative of a measured biometric parameter, compared with at least one piece of information representative of a biometric parameter of a user authorized to use the contactless communication object.

According to another particularity, the biometric sensor is a fingerprint sensor.

According to another particularity, the fingerprint sensor is an optical reader in front of which the user passes his/her finger.

According to another particularity, the biometric sensor is an iris reader.

According to another particularity, the biometric sensor is a voiceprint analyzer.

According to another particularity, the interactive authentication means and the comparison means comprise power supplying means for achieving the comparison and controlling the switching means before the entry of the secured system in the range area.

Another objective of the present invention is to find a remedy to one or several drawbacks of the prior art by proposing a simple device for protecting a contactless communication object, against accidental or fraudulent intrusion, without requiring a change in the layout of the electronic circuit of the object and designed in order to be adapted to the existing apparatuses.

This objective is achieved by a device for protecting at least one contactless communication object with a smart circuit storing sensitive information or information giving access to services, characterized in that it comprises at least means for receiving radio signals in a range of frequencies of the order of one megahertz to a few tens of megahertz, the received radio signals generating the power for operating the protection device in order to enable a circuit generating a scrambling signal to be emitted by emission means of the protection device as scrambling radio waves, a determined coil in a tuned resonant circuit belonging to or forming a part of the radio emission and reception means of the protection device, and switching means validating or invalidating the operation of the scrambling signal generator of the protection device, the switching means of the protection device being controlled, according to the result of a comparison performed, by comparison means between one piece of information stemming from interactive authentication means on the one hand and a piece of information stored in memory storage means of the protection device on the other hand.

According to another particularity, the scrambling signal is emitted as soon as the first signals have been received before the end of a request in accordance with a communication protocol.

According to another particularity, at least the radio emission and reception means of the protection device and the circuit of the protection device are inserted into a casing of the same dimensions as the protected contactless communication object with a smart circuit.

According to another particularity, the switching means comprise a switch positioned at the surface of the protection device or in a recessed housing made in the thickness of the protection device.

According to another particularity, the switching means comprise a switch positioned at the end of a line of communication connected to the protection device.

BRIEF DESCRIPTION OF THE DRAWINGS

The foregoing and other objects and advantages of the invention and the manner in which the same are accomplished will become clearer based on the following detailed description taken in conjunction with the accompanying drawings in which.

DETAILED DESCRIPTION

The present invention will now be described more fully hereinafter with reference to the accompanying drawings, in which a preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

A protection device (1) is used with one or more objects (3), for example portable objects, establishing a contactless communication with a terminal (2) or reader. The secured contactless communication objects (3) are positioned in an area (20) within the range of the terminal or reader, in order to be powered by radio waves (S22) emitted by the terminal (2) or reader, and to establish a contactless communication with the latter. The protection device (1) is placed in the range area (20) at the same time as one or more contactless communication objects (3) to be protected. In the range area, the electromagnetic field, in a non-limiting way, has a value comprised between 1 A/m and 10 A/m, for example.

Figure 1:
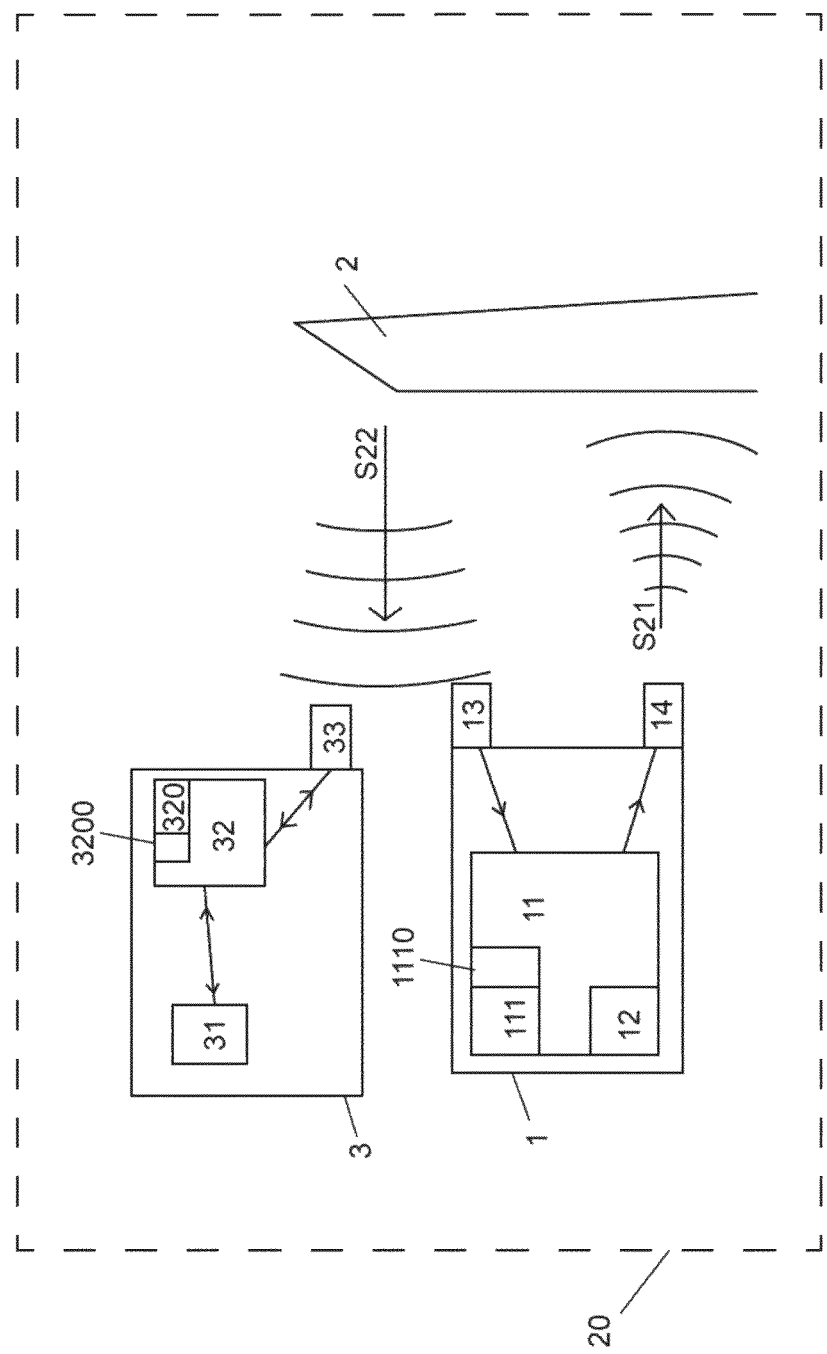
FIG. 1 illustrates an exemplary secured contactless communications system according to the invention.

As illustrated in FIG. 1, the protection device (1) including a comparison means (111) comprising a power supply means (1100) is positioned in the area (20) within the range of the communications terminal (2) or reader, in order to secure the contactless communication object (3) with a smart circuit storing sensitive information or information giving access to services. The protection device (1) is therefore in the area (20) of the terminal or reader, as well as the communication object(s) protected by the protection device. The contactless communication object (3), for example, comprises memory space (31) comprising sensitive information or giving access to services, in communication with a power supply and processing circuit (32) including a comparison means (320) comprising a power supply means (3200). The power supply and processing circuit (32) is on the other hand connected to power supply and communication means by radio waves, for example comprising an antenna (33). It will be understood that the antenna may be referred to as radio reception means and radio emission means.

The protection device (1) comprises radio reception and power supply means (13) in communication with power supply means and processing means, for example as a power supply and processing circuit (11), either enabled or disabled by switching means (12). The switching means (12) for example comprise a switch (101) or a push-button, in order to either authorize the operation of the protection device (1) or not. The switch (101) in a non-limiting way is a mechanically actuated contact switch or an electronic switch for example comprising a controlled transistor. The switch is, for example, positioned by a push-button which either achieves an electric contact or not depending on its position.

According to another exemplary embodiment, a transistor switch such as for example a power transistor, is controlled by electronic control means in a conducting or blocked position depending on an entry parameter. The entry parameter is, for example, the position of a control button or the result of a comparison between a piece of digital information stored in memory storage means of the protection device and a piece of information representative of a biometric parameter produced by a sensor. In a non-limiting way, the comparison is carried out in an authentication device or in the protection device (1). According to another exemplary embodiment, without departing from the idea of the invention, the comparison is carried out in the protected communication object.

When the switching means (12) are placed in a position for authorizing operation, a radio frequency signal (S22) received by the receiving means (13) triggers the powering of the protection device (1) via its power supply means. The power supply and processing circuit (11), for example, supplied with power, comprises means for processing the received radiofrequency signal in order to emit a scrambling radiofrequency signal (S21) by emission means (14) of the protection device (1).

When the switching means (12) are placed in a position for preventing operation, the protection device (1) no longer emits a scrambling radio signal. The switching means for example comprise a switch (101) for controlling, in a non-limiting way, the enabling or disabling of the receiving means, the power supply means, the processing means or the emission means.

A radiofrequency signal (S22), emitted by a contactless reader or terminal (2) covers its range area (20) and broadcasts power at the same time as a piece of information. This signal (S22) is for example used by the contactless communication object (3) with a smart circuit, partly for its powering and partly for receiving and processing the contained information. The signal (S22) emitted by the terminal (2) or reader is for example emitted with a first modulation frequency determined according to a first type of determined modulation. The signal emitted by the contactless communication object (3) with a smart circuit, is for example emitted with a second modulation frequency determined according to a second type of determined modulation. In order to scramble this communication, upon its being enabled, the protection device (1) comprises power supply means, receiving and demodulating means and emission and modulation means compatible with the terminal or reader, for example in a non-limiting way, identical with those of the contactless communication object (3) with a smart circuit. In a non-limiting way, upon receiving a signal (S22) emitted by the terminal or reader, the scrambling signal (S21) is representative of information either depending on received information or not. In a non-limiting way, the scrambling signal (S21) is representative of a random message, of a sequence of "1s", of a sequence of "0s" or of a message resulting from the processing of the received message.

In a non-limiting way, a contactless communication object type, secured by the protection device, is for example described in patent application WO 98/26370. Contactless communicating objects in a non-limiting way are portable objects made with the standard format of credit cards. The dialog between the contactless reader or communication terminal and the contactless communication objects is for example described in patent EP 0 472 472.

The protection device (1) is also used in a non-limiting way for securing one or more contactless communication objects (3) such as identification cards, contactless integrated circuit cards or proximity cards compliant with the ISO/IEC 14443 standard, defined by the International Standardization Organization and the International Electrotechnical Commission. The 2001 edition of the ISO/IEC 14443 standard on identification cards, contactless integrated circuit cards or proximity cards is subdivided in four parts. A first part designated as ISO/IEC 14443-1:2001, deals with the physical characteristics of these cards. A second part designated as ISO/IEC 14443-2:2001, deals with the radiofrequency interface and the communication signals and notably on the components to be provided for powering the card and for the bidirectional communication between the card and the terminal or reader. A third part designated as ISO/IEC 14443-3:2001, deals with initialization and anti-collision and notably with the methods for communicating with a card in an environment comprising several cards. A fourth part designated as ISO/IEC 14443-4: 2001, deals with the transmission protocol.

The scrambling signal (S21) is emitted upon receiving the signal (S22) emitted by the terminal (2) or reader, when the switching means of the protection device are in a position for authorizing operation. The emission controlled by the processing means of the protection device is performed in a non-limiting way as soon as the signal is received or after a determined time-out. The scrambling signal (S21) is thus repeated for each received signal (S22) emitted by the terminal (2) or the reader. Whereas a contactless communication object (3) with a smart circuit observes time slots for authorizing emission or for awaiting emission, the protection device emits a scrambling signal as long as its power supply means provide power. A terminal (2) or a contactless reader, operating for example according to the ISO/IEC 14443 standard for example establishes a dialog with one or several contactless communication objects (3) with a smart circuit according to a determined communication protocol in time intervals also called slots. The scrambling signal (S21) is emitted by the scrambling device at the same time as the signal (S22) emitted by the terminal or reader, at the same time as a signal emitted by a contactless communication object (3) with a smart circuit or in a normally unoccupied time slot. A normally unoccupied time slot for example is an emission waiting time by the contactless communication object (3) after receiving a signal (S22) emitted by the terminal (2) or reader. Thus, the message representative of a signal emitted by a contactless communication object (3) is scrambled by the additional scrambling signal (S21). Further, the communications protocol used by the terminal (2) or reader becomes entirely unusable. This type of protocol, which for example begins with an initialization step, remains blocked in a non-limiting way in the initialization step.

Advantageously, the protection device according to the invention is added to a functional communications system between contactless reader or terminal and one or more contactless communication objects (3) with a smart circuit, in order to achieve a virtual wall between the terminal (2) or reader, and the contactless communication objects (3) without changing the structure of the existent communications system. A user by enabling the security device thus prevents an intrusion into sensitive information or information giving access to services, contained in its contactless communication object (3) with a smart circuit. In order to use his/her contactless communication object (3), the user disables the security device by the switching means.

Advantageously, the protection device (2) according to the invention, powered by radiofrequencies, uses the same sources of energy for its power supply as the protected contactless communication object (3). In a non-limiting way, the receiving means comprise an antenna also used by the emission means for emitting the scrambling signal. The carrier frequency of the signal, received or emitted by the security device, is for example a determined frequency of the short wave type, comprised between 1 MHz and 30 MHz.

Figure 3:
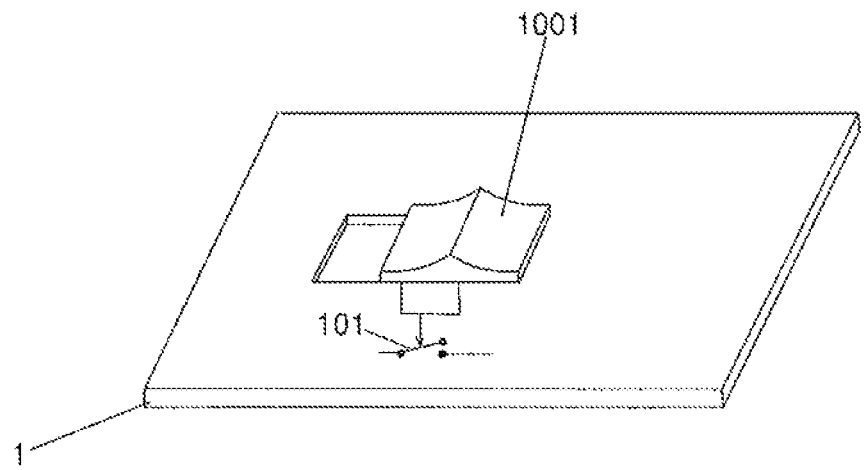
FIG. 3 illustrates a perspective view of an exemplary protection device according to the invention, with the format of a credit card and equipped with a switch.
Figure 4:
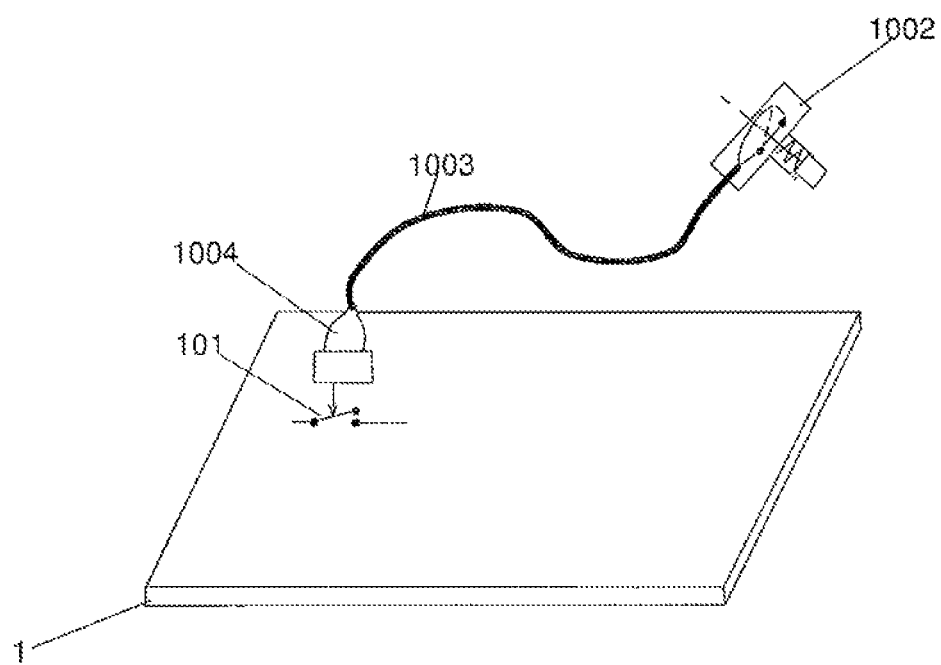
FIG. 4 illustrates a perspective view of an exemplary protection device according to the invention equipped with a remote control.

Advantageously, the protection device (1) as illustrated in FIGS. 3 and 4 is produced with the dimensions of a credit card. Thus, the protection device (1) is positioned with a contactless communications card in a wallet, the protection device (1) being enabled or disabled. In this way, when the contactless communications card is placed in an area (20) within the range of a contactless reader or terminal (2), the protection device (1) is placed at the same time in this range area (20) for securing the card when the protection device is enabled. As illustrated in FIG. 3, a push-button (1001) positioned on the protection device (1) mechanically or electronically controls the position of the switch (101) in order to enable or disable the protection device (1). The push-button positioned in a recessed housing in the protection device, makes it possible to have minimum thickness in order to place the protection device in a wallet. When the protection device is enabled and placed in a wallet with a contactless communication card, the user may transport his/her wallet safely without any risk of intrusion by a radiofrequency terminal or a contactless reader. In order to use his/her contactless communication card, for example in order to make payments in a secured commercial space, the user disables the protection device by shifting the push-button (1001), the protection device for example remaining in his/her wallet.

FIG. 4 illustrates an alternative of the protection device (1) disabled by a remote control (1004, 1003, 1002). The protection device (1) is for example connected through a connector (1004) to a two-wire communications cable (1003) at the end of which is connected a push-button (1002) positioned by the user. The button (1002) directly produces an electrical connection or enables or disables an electronic circuit for controlling the switch (101) connected to the connector (1004). The protection device (1) is for example positioned in the wallet of the user with a contactless communication card to be secured, the wallet being in the inside pocket of the jacket of the user. The cable for example leaves the connector (1004) and then passes inside the sleeve of the jacket right down to the hand of the user who may by pressure of the hand change the state of the push-button (1002) in order to produce, through the connector (1004), a control signal for disabling the protection device. The user thus controls time intervals during which radiofrequency communication with his/her contactless communications card is authorized. When the switch (101) is not enabled, the protection device is for example enabled by default.

According to another exemplary embodiment, the portable contactless communication object and the protection device are made as a compact solid, for example hooked on a same key holder ring.

Figure 2:
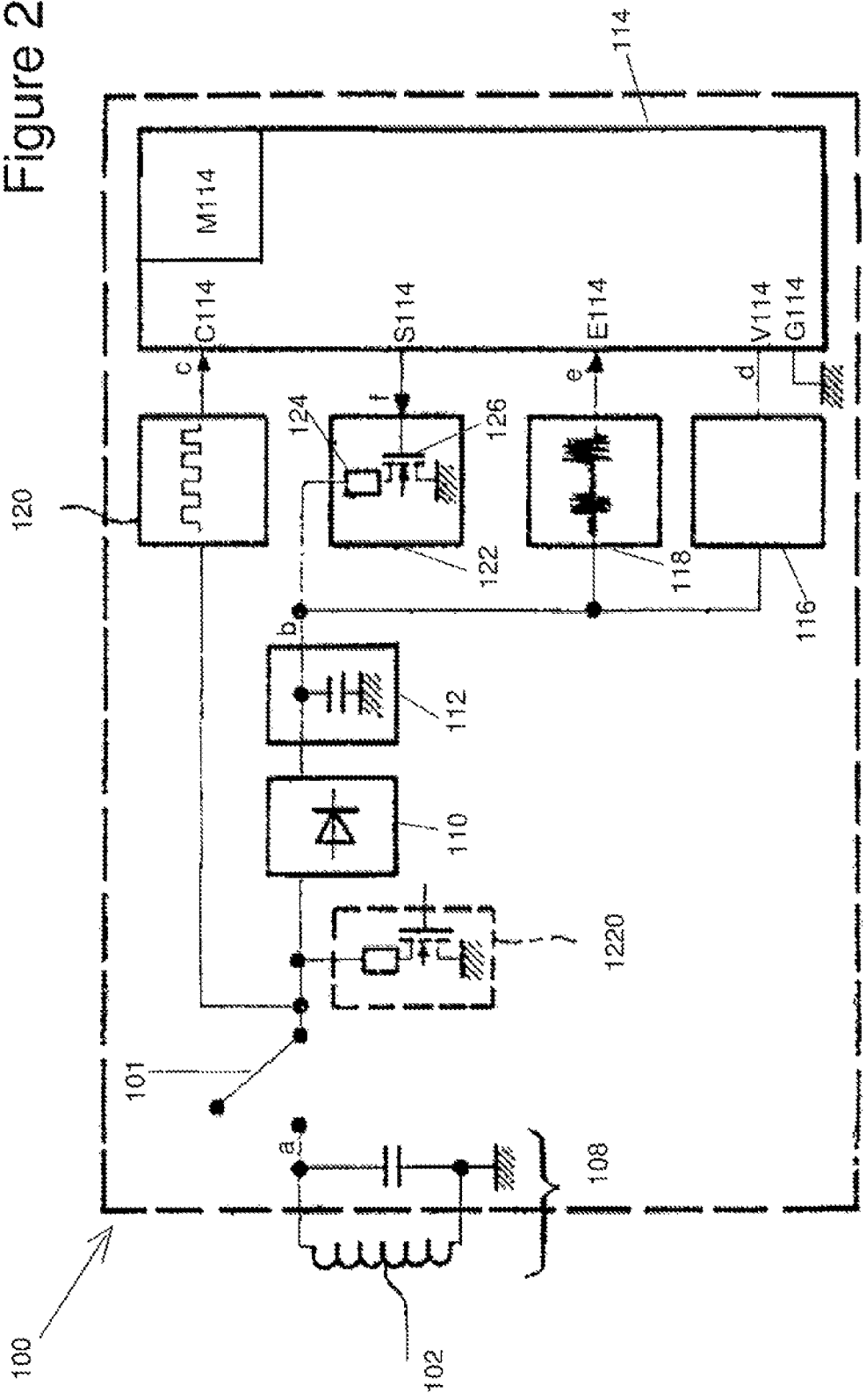
FIG. 2 illustrates an electronic diagram of an exemplary protection device according to the invention.

According to a non-limiting exemplary embodiment, as illustrated in FIG. 2, the security device (1) comprises an enabled electronic circuit (100) in the area (20) within the range of a contactless reader or a terminal (2), when its switch (101) is in an enabling position, authorizing operation of the security device.

In a non-limiting way, the switch cuts off the receiving circuit (108) in order to prevent or authorize at the same time reception of information and reception of powering energy.

According to another exemplary embodiment, the switch (101) is connected to an input of a smart circuit (114), the logic state of this entry determining the state of the smart circuit (114) for either controlling emission of a scrambling wave or not.

According to another exemplary embodiment, the switch (101) either cuts off the emission circuit (1220, 122) from the remainder of the circuit or not in order to prevent emission of scrambling radio waves.

This electronic circuit (100) in a non-limiting way comprises a coil (102), belonging to or forming a part of a tuned resonant circuit (108) radiating the field in free space, for sensing a modulated magnetic field (S22) originating from the terminal (2) or reader, or for producing as a response a modulated scrambling signal (S21) of this magnetic field. The signals are for example modulated according to a carrier frequency of about 13 MHz, in a non-limiting way for a coil of the order of 4 to about ten turns. In a non-limiting way, advantageously, as the number of turns of the protection device (1) is larger than the number of turns of the protected communication object (3), the protection device (1) will have a minimum response time less than that of the protected object, upon receiving radio signals emitted by the terminal or reader. The electronic circuit (100) of the security device also comprises converter means (110, 112, 116), cooperating with the coil (102) in order to transform the magnetic field (S22) sensed by the latter into a DC voltage (d) for powering the electronic circuit (100) of the protection device (1), these means comprising a rectifier stage (110) and a filtering stage (112). A regulator stage (116) is for example added in series in order to deliver a voltage (d) of a determined value.

The electronic circuit (100) of the protection device (1) on the other hand comprises emission means (108, 1220, 122) and means (108, 110, 112, 120) for receiving data, also cooperating with the coil. A clock extraction stage (120) receiving at the input the signal (a) collected on the terminals of the tuned circuit (108), delivers at the output a signal (c) applied to the clock input (C114) of the smart digital circuit (114). The regulator stage (116), a voltage stabilizer, for example delivers at the output a rectified, filtered and stabilized DC voltage (d) notably applied to a positive power supply terminal (V114) of the smart digital circuit (114), the other power supply terminal (G114) of which is the ground. A modulator stage (122, 1220) operates by charge modulation for example, this technique consisting of varying in a controlled way the current consumed by the tuned circuit (108) located in the surrounding magnetic field generated by the terminal or reader. The modulator circuit (122) includes a resistive component (124) (an added resistor or, in monolithic technology, a gateless MOS type component acting as a resistor) in series with a switching component (126) (MOS transistor) controlled by a modulation signal (f) generated by an output (S114) of the digital circuit 114.

The receiving means, in a non-limiting way, include means (118) for demodulating the signal sensed by the coil (102), these demodulating means (118) operating on the signal (b) delivered at the output of the rectifying (110) and filtering (112) stages. A demodulating circuit (118) for example provides a signal (e) representative of the information comprised in the radio signal (S22) emitted by the terminal (2) or reader. The signal (e) at the output of the demodulation circuit (118) is transmitted to an input (E114) of the circuit (114) in order to be processed. The circuit (114) for example executes a processing program residing in its memory (M114) in order to produce a scrambling signal (f). In a non-limiting way, the demodulating means perform amplitude or phase modulation respectively, the emission means including modulating means performing amplitude modulation or phase modulation respectively. In an alternative embodiment, the signal at the input of the demodulator directly originates from the resonant circuit (108) without being rectified or filtered.

According to another exemplary embodiment, the electronic circuit (100) of the protection device (1) does not comprise any demodulation means for extracting the information in the radio signal (S22) emitted by the terminal (2) or reader. The clock extraction circuit (120) for example provides the clock signal at the input (C114) of a smart counter circuit (114) for dividing by an integer, for example equal to 16. The smart divider circuit (114) for example produces a scrambling signal (f) transmitted to a modulating circuit (122, 1220). According to an alternative embodiment, the modulated scrambling signal is representative of a message residing in memory (M114), the emission being clocked by the clock signal (c).

In a non-limiting way, the modulating stage (122) is placed downstream from the rectifying (110) and filtering (112) circuits, or upstream from these circuits, as illustrated in FIG. 2, i.e. directly at the terminals of the resonant circuit (108).

In a non-limiting way, the scrambling radio signal (S21) is emitted by a control of the smart circuit (114) as soon as the electronic circuit (100) is powered or after a determined time-out or after detection of the end of emission by the smart circuit (114).

Advantageously, the simplicity of the logic operations carried out by the smart component (114), for example of the divider type, requires very little power resources for operating the smart component (114) and makes it possible to have maximum emission power.

According to an alternative embodiment, as illustrated in FIGS. 5-8, the protection device (1) is sealed to the portable contactless communication object (3) to be secured. Sealing is for example performed with rigid members nested in the portable contactless communication object (3) to be secured, so as to destroy or make this portable object (3) unusable in the case of a separation.

According to another example, the portable contactless communication object (3) to be secured and the protection device (1) are molded in a same plastic part.

According to another exemplary embodiment, the protection device equipped with an authentication device comprises a housing for one or more contactless communication objects, the housing then being closed by secured closing means. Opening the housing in order to remove contactless communication objects, is for example performed by means of a security key. The secured closing means for example comprise means for destroying contactless communication objects. The secured closing means for example comprise means for crushing a portion of the contactless communication object, in order to invalidate the object placed in the housing, in the case of a break-in.

In the exemplary embodiments illustrated in FIGS. 5-8, the switching means enable or disable the protection device (1) by an authentication device (1010; 1011; 1012, 1013, 1014; 1015, 1016, 1017). In a non-limiting way, the authentication device comprises power supply means or is powered by power supply means of the protection device. In the case when the authentication device requires significant power and comprises its own power supply means (1020), such as for example a battery cell or a power supply battery, the authentication device maintains the switching means in the position for enabling the protection device, when its power supply means (1020) are no longer operational. In the case for example when an authentication device comprises a power supply battery cell and that this battery cell no longer stores any energy, the switch for example remains in the closed position in order to allow operation of the protection device and prevent fraudulent use of the portable contactless communication object (3) to be protected. The assembly formed by the portable contactless communication object (3) and the protection device (1) equipped with an authentication device, is thus protected against accidental or fraudulent intrusions and its use is limited to a person having valid access at the authentication device. The authentication device is for example configured in order to allow the use by a single person or by a group of determined persons.

According to an exemplary embodiment, the authentication device comprising power supply means (1020), comprises means for disabling the operation of the protection device (1) regardless of the position of the protection device, for example outside an area (20) within the range of a contactless reader or a terminal. In a non-limiting way, the disabling control is performed during a determined disabling period of time or until the protection device (1) leaves the range area (20). The authentication device, in communication with the protection device (1) for example comprises means in order to detect whether the protection device (1) is no longer powered, in order to control the switching means (101) of the protection device (1) in a position authorizing the operation of the protection device (1).

Figure 5:
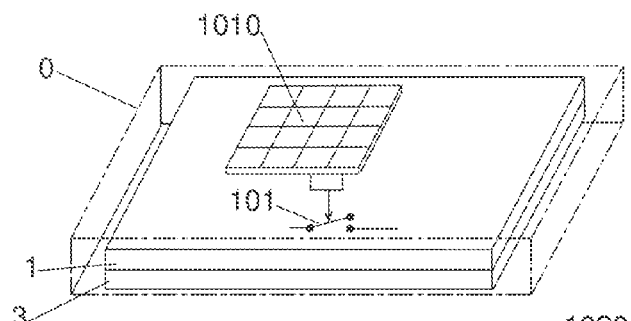
FIG. 5 illustrates a perspective view of a contactless communications assembly according to the invention secured by a keyboard for entering a secret code.

According to the example of FIG. 5, the protection device (1) is for example disabled by an authentication device (1010) including a keyboard. When a user types the correct identification code on the keyboard, first communication means transmit the code to processing means of the authentication device, which control, via second communication means, the disabling of the protection device (1). The processing means of the authentication device for example control the switch (101) in an open or closed position.

Figure 6:
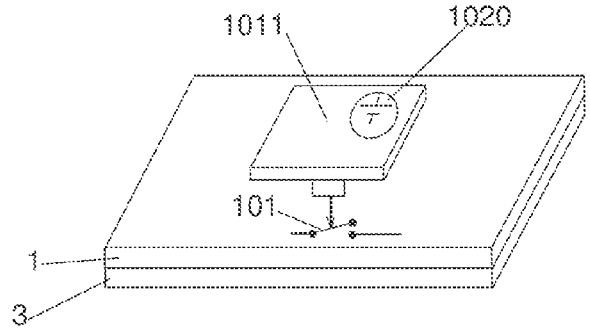
FIGS. 6, 7 and 8 each illustrate a perspective view of a contactless communications assembly according to the invention secured by a biometric parameter reader.

According to an alternative embodiment, as illustrated in FIG. 6, the protection device (1) is disabled by an authentication device (1011) by fingerprint recognition. Non-limiting examples of fingerprint sensors are: an optical print sensor, a thermal electrical sensor, a capacitive sensor, an electric field sensor or a pressure sensor. According to a non-limiting exemplary embodiment, a fingerprint sensor Authentec AES1510 or a fingerprint sensor UPEK TCS3C or a fingerprint sensor Veridicom are used for disabling the protection device.

In a non-limiting way, a fingerprint optical sensor performs a capture of a representative picture of the print, or a capture of a series of images by relative displacement of the portion of the finger comprising the fingerprint relatively to the print optical reader. The relative displacement of the finger relatively to the optical sensor for example allows an operation of the scanning type to be performed. The user for example moves his/her finger in front of an optical reader array.

When the user of the portable contactless communication object (3) places or passes his/her finger over the fingerprint recognition device (1011), a signal representative of the sensed print, is transmitted via first communications means to processing means of the authentication device, in order to be compared with one or more authorized codes stored in the memory storage means of the protection device (1). If the result of the comparison is valid, the processing means control, via second communications means, the switch (101) in order to disable the protection device (1) for a determined period of time, for example in a non-limiting way from 1 second to 1 minute, this time allowing the contactless transaction to be carried out.

Figure 7:
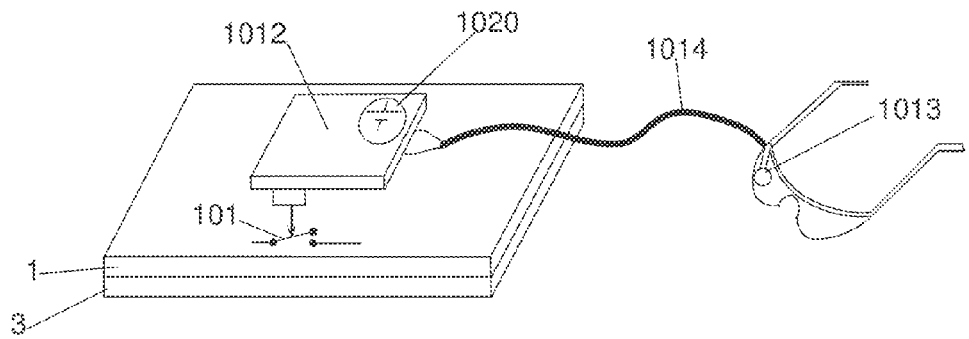

According to an alternative embodiment, as illustrated in FIG. 7, the protection device is disabled by an authentication device (1012, 1014, 1013) by visual recognition, for example of the iris. The iris reader for example comprises a digital video camera equipped with an objective of the macro type, associated with a means for illuminating the iris positioned close the eye.

The authentication device for example includes a device for recognizing the iris, attached on spectacles (1013) or another support, worn by the user, and connected through a communication cable (1014) with a processing circuit (1012) which enables or disables the switch (101). When the user of the portable contactless communication object (3) places the iris reader in front of his/her eye, a signal representative of the iris print is transmitted via first communication means to processing means of the authentication device in order to be compared with one or more authorized codes stored in the memory storage means of the protection device (1). If the result of the comparison is valid, the processing means control the switch (101) via second communications means in order to disable the protection device (1).

Figure 8:
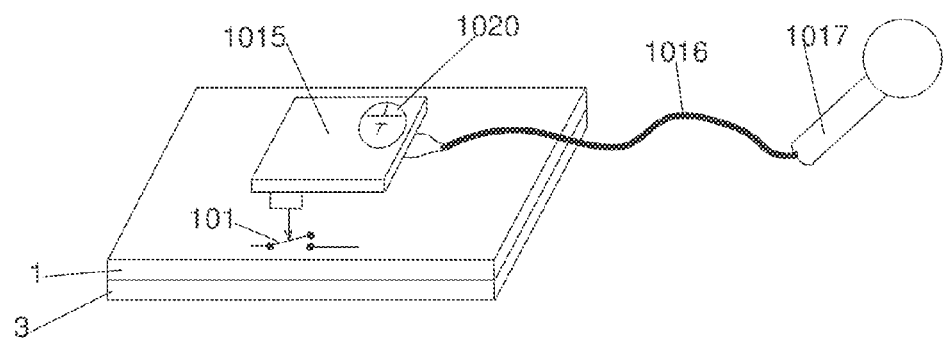

According to another exemplary embodiment, as illustrated in FIG. 8, the protection device (1) is disabled by a voice recognition authentication device (1011) including a microphone (1017) connected through a communication cable (1016) to a processing circuit (1015). When the user of the portable contactless communication object pronounces a key audio message in the microphone, a signal representative of the audio message is transmitted via the cable (1016) to the processing circuit (1015). The processing circuit comprises means for analyzing this signal representative of the audio message and controls the disabling of the protection device (1) if the audio message is authenticated. Authentication for example comprises a comparison of the signal representative of the pronounced audio message with one or more authorized signals stored in the memory storage means of the protection device (1).

In the case when authentication fails, the switch (101) remains in a stable state for authorizing operation of the protection device (1). In a non-limiting way, if authentication is successful, the processing means control the opening of the switch (101) for a determined period of time, for example comprised between 1 second and 1 minute, and then return into a stable state for controlling the closure of the switch (101) in order to enable the protection device.

It should be obvious for a person skilled in the art that the present invention allows embodiments under many other specific forms without departing from the field of application of the invention as claimed. Therefore, the present embodiments should be considered as illustrative, but may be modified in the field defined by the scope of the appended claims, and the invention should not be limited to the details given above.

The invention claimed is:

1. A protection device for a contactless communication object (3) with a smart circuit (31, 32) storing sensitive information or information giving access to services, the protection device (1) comprising:
   at least one radio receiver (13) for receiving first radio signals (S22) emitted by a contactless reader or terminal (2), in a range of frequencies of the order of one megahertz to a few tens of megahertz, the first received signals (S22) generating the power for operating the protection device (1) in order to enable a circuit (11) of the protection device (1) to generate a scrambling signal (f) to be emitted by a radio emitter (14) of the protection device as scrambling radio waves (S21) intended for the terminal (2) or the reader, the scrambling radio waves (S21) being produced by the circuit (11) upon receiving the first signals with sufficient power so as to be received by a radio receiver of the terminal (2) or the reader, and to deteriorate the reception by the radio receiver of the terminal (2) or the reader of second radio signals emitted by the contactless communication object (3), in response to enabling by the terminal (2) or the reader;
   a switch (12) for validating or invalidating the scrambling by the protection device (1), the switch (12) of the protection device (1) being controlled according to the result of a comparison carried out by a means for comparison between a piece of information stemming from a means for interactive authentication (1010, 1011, 1012, 1015) of the protection device on the one hand, and a piece of information stored in the memory storage means of the protection device (1) on the other hand; and
   a smart circuit, wherein the smart circuit (114) requires minimal power resources for operation in favor of the energy used by the radio emitter (14) of the protection device (1) to have maximum emission power for at least one scrambling signal (S21).

2. The protection device according to claim 1, wherein the contactless communication object (3) protected by the protection device (1) is enabled in an area (20) within the range of the terminal (2) or of the reader, the terminal or reader emitting the first radio signals (S22) via a radio emitter, in order to communicate with the contactless communication object (3) and to supply the contactless communication object with energy by a radio receiver (33) of the contactless communication object; and
   wherein the contactless communication object (3) emits the second radio signals, via the radio emitter (33) of the contactless communication object, for communicating with the terminal (2) or the reader, via the radio receiver of the terminal or the reader.

3. The protection device according to claim 2, wherein the radio receiver (33) of the contactless communication object and the radio receiver (13) of the protection device (1) each comprise a coil (102) forming a part of a determined tuned resonant circuit (108).

4. The protection device according to claim 3, wherein the radio emitter (33) of the contactless communication object and the radio emitter (14) of the protection device (1) each comprise the coil (102) in the tuned resonant circuit (108) used for radio reception.

5. The protection device according to claim 2, wherein the communication between the terminal or the reader on the one hand and the contactless communication object on the other hand, is performed according to a determined anti-collision protocol, the contactless communication object emitting the second radio signals in response to the first radio signals at least after emission of a request by the first signals, the circuit (11) of the protection device (1) controls emission of scrambling radio waves (S21) in response to the first radio signals, the emission of scrambling radio waves being maintained during the reception of the first signals.

6. The protection device according to claim 5, wherein the scrambling signal received by the terminal (2) or the reader is representative of determined data processed by a processing means of the terminal or the reader, in order to cause reinitialization in the execution of the anti-collision protocol.

7. The protection device according to claim 5, wherein the scrambling signal, received by the terminal (2) or the reader, is representative of determined data processed by processing means of the terminal or of the reader in order to cause a saturation of the processing means.

8. The protection device according to claim 1, wherein the circuit (11) of the protection device comprises a counter for dividing a modulation frequency of the first signals emitted by the terminal (2) or the reader.

9. The protection device according to claim 1, wherein the means for interactive authentication of the protection device comprise a biometric sensor transmitting to an authentication circuit of the protection device a piece of information representative of a measured biometric parameter to be compared with at least one piece of information representative of a biometric parameter of a user authorized to use the contactless communication object (3), making up the information stored in the memory storage means of the protection device (1).

10. The protection device according to claim 1, wherein the means for interactive authentication of the protection device comprise an alphanumerical keyboard transmitting to an authentication circuit of the protection device a piece of information representative of a code entered by a user to be compared with at least one authorization code for using the contactless communication object (3), making up the information stored in the memory storage means of the protection device (1).

11. The protection device according to claim 1, wherein the switch is selected from the group consisting of a switch and a push-button, and is positioned at the surface of the protection device.

12. The protection device according to claim 1, wherein the switch is selected from the group consisting of a switch and a push-button, and is positioned in a recessed housing formed in the thickness of the protection device.

13. The protection device according to claim 1, wherein the switch comprises an electronic switch positioned at an end of a line of communication connected to the protection device.

14. The protection device according to claim 1, wherein the means for comparison is comprised in said contactless communication object (3) or said protection device.

15. A secured portable contactless communications system comprising:
at least one contactless communication object (3) with a smart circuit (31, 32) storing sensitive information or information giving access to services, the contactless communication object (3) comprising a radio receptor (33) for communication and power supply signals and radio emitter (33) for communication signals, and a first determined coil in a first tuned resonant circuit forming a part of the radio emitter and radio receptor (33) of the contactless communication object (3);
the system further comprising:
at least one protection device (1) comprising a radio receptor (13) for communication and power supply signals, in a range of frequencies of the order of one megahertz to a few tens of megahertz, in order to enable a circuit (11) of the protection device generating a scrambling signal (f) to be emitted by an emitter (14) of the protection device as scrambling radio waves (S21) upon receiving first radio signals (S22) emitted by a contactless reader or terminal (2), a second determined coil (102) in a second tuned resonant circuit (108) forming a part of the radio emitter and radio receptor of the protection device, and a switch (12) allowing validation or invalidation of the operation of the circuit (11) generating the scrambling signal of the protection device;
wherein the switch (12) of the scrambling circuit is controlled, according to the result of a comparison carried out by a means for comparison between a piece of information stemming from a means for interactive authentication (1010, 1011, 1012, 1015) of the protection device on the one hand and one piece of information stored in memory storage means of the protection device (1); and
wherein the protection device (1) and the contactless communication object are firmly attached to each other in a casing (0) with a secured closure, the closing of the casing validates the operation of the protection device.

16. The secured system according to claim 15, wherein the secured casing is molded in a single block on the protection device (1) and the contactless communication object (3).

17. The secured system according to claim 15, wherein the secured casing is closed around the protection device (1) and the contactless communication object (3), the opening of the casing being controlled by a secured key.

18. The secured system according to claim 15, wherein the secured casing includes a housing for receiving at least one additional contactless communication object storing sensitive information or information giving access to services.

19. The secured system according to claim 15, wherein the means for interactive authentication comprise an alphanumerical keyboard transmitting to the means for comparison, a piece of information representative of a code entered by a user, compared with at least one authorization code for the use of the contactless communication object (3).

20. The secured system according to claim 15, wherein the means for interactive authentication comprise a biometric sensor transmitting to the means for comparison, a piece of information representative of a measured biometric parameter, compared with at least one piece of information representative of a biometric parameter of a user authorized to use the contactless communication object (3).

21. The secured system according to claim 20, wherein the biometric sensor is a fingerprint sensor.

22. The secured system according to claim 21, wherein the fingerprint sensor is an optical reader in front of which the user passes his/her finger.

23. The secured system according to claim 20, wherein the biometric sensor is an iris reader.

24. The secured system according to claim 20, wherein the biometric sensor is a voiceprint analyzer.

25. The secured system according to claim 15, wherein a power supply is comprised in the means for interactive authentication and the means for comparison, and powers the means for comparison and the means for interactive authentication for performing comparison and controlling the switch before the entry of the secured system into an area (20) within the range of a contactless reader or terminal (2).

26. The secured system according to claim 15, wherein the means for comparison is comprised in said contactless communication object (3) or said protection device.

27. A device for protecting at least one contactless communication object with a smart circuit storing sensitive information or information giving access to services, the protection device (1) comprising:
- at least one radio receptor (13) for receiving radio signals (S22) in a range of frequencies of the order to one megahertz to a few tens of megahertz, the received radio signals (S22) generating the energy for operating the protection device (1) in order to enable a circuit (11) generating a scrambling signal (f) to be emitted by a radio emitter (14) of the protection device as scrambling radio waves (S21) upon receiving first radio signals (S22) emitted by a contactless reader or terminal (2);
- a determined coil (102) in a tuned resonant circuit (108) forming a part of the radio emitter and the radio receptor of the protection device (1); and
- a switch (12) for validating or invalidating the operation of the circuit (11) generating the scrambling signal of the protection device (1), the switch (12) of the protection device (1) being controlled, according to the result of a comparison carried out by a means for comparison of the protection device between a piece of information stemming from a means for interactive authentication (1010, 1011, 1012, 1015) on the one hand and a piece of information stored in a memory storage means of the protection device (1) on the other hand; and
- a smart circuit (114), wherein the smart circuit requires minimal power resources for operation in favor of energy used by the radio emitter (14) of the protection device (1) to have a maximum emission power for at least one scrambling signal (S21).

28. The protection device according to claim 27, wherein the scrambling signal is emitted upon receiving the first signals before the end of a request according to a communications protocol.

29. The protection device according to claim 27, wherein at least the radio emitter and radio receptor of the protection device and the circuit of the protection device are inserted in a casing for housing the protected contactless communication object with a smart circuit.

30. The protection device according to claim 27, wherein the switch comprises a switch positioned at the surface of the protection device.

31. The protection device according to claim 27, wherein the switch comprises a switch positioned in a recessed housing made in the thickness of the protection device.

32. The protection device according to claim 27, wherein the switch comprises a switch positioned at an end of a line of communication connected to the protection device.

33. A secured portable contactless communications system comprising:
- at least one contactless communication object (3) with a smart circuit (31, 32) storing sensitive information or information giving access to services, the contactless communication object (3) comprising a radio receptor (33) for communication and power supply signals and a radio emitter (33) for communication signals, and a first determined coil in a first tuned resonant circuit forming a part of the radio emitter and radio receptor (33) of the contactless communication object (3);

the system further comprising:
- at least one protection device (1) comprising a radio receptor (13) for communication and power supply signals, in a range of frequencies of the order of one megahertz to a few tens of megahertz, in order to enable a circuit (11) of the protection device generating a scrambling signal (f) to be emitted by an emitter (14) of the protection device as scrambling radio waves (S21), a second determined coil (102) in a second tuned resonant circuit (108) forming a part of the radio emitter and radio receptor of the protection device, and a switch (12) allowing validation or invalidation of the operation of the circuit (11) generating the scrambling signal of the protection device;
- wherein the switch (12) of the scrambling circuit is controlled, according to the result of a comparison carried out by a means for comparison of the protection device between a piece of information stemming from a means for interactive authentication (1010, 1011, 1012, 1015) of the protection device on the one hand and one piece of information stored in memory storage means of the protection device (1);
- wherein the protection device (1) and the contactless communication object are firmly attached to each other in a casing (0) with a secured closure, the closing of the casing which validates the operation of the protection device;
- wherein the secured casing is molded in a single block on the protection device (1) and the contactless communication object (3);
- wherein the secured casing is closed around the protection device (1) and the contactless communication object (3), the opening of the casing being controlled by a secured key; and
- wherein the secured casing includes a housing for receiving at least one additional contactless communication object storing sensitive information or information giving access to services.

* * * * *